United States Patent [19]
McKenzie

[11] Patent Number: 5,454,456
[45] Date of Patent: Oct. 3, 1995

[54] THIRD RAIL COLLECTION ASSEMBLY AND BEAM THEREFOR

[76] Inventor: Dan McKenzie, P.O. Box 198, Schenectady, N.Y. 12305

[21] Appl. No.: 264,609

[22] Filed: Jun. 23, 1994

[51] Int. Cl.⁶ ........................................................ B60L 5/39
[52] U.S. Cl. ........................................................ 191/49
[58] Field of Search ......................... 191/1 R, 49, 59.1, 191/45 R; 246/192 A

[56] References Cited

U.S. PATENT DOCUMENTS

| | | | |
|---|---|---|---|
| 881,531 | 3/1908 | Baukat | 191/49 |
| 886,319 | 4/1908 | Farnham | 191/49 |
| 995,145 | 6/1911 | Jackson | 191/49 |
| 1,308,543 | 7/1919 | Howe | 246/196 |
| 1,766,639 | 6/1930 | Howe | 191/49 |
| 3,089,005 | 5/1963 | Dean | 191/49 |
| 3,509,292 | 4/1970 | Dehn | 191/49 |
| 3,733,446 | 5/1973 | Colovas | 191/49 |
| 3,740,498 | 6/1973 | Herbert | 191/49 |
| 3,799,065 | 4/1974 | Jackson | 191/49 X |
| 3,804,996 | 4/1974 | Monteith | 191/1 R |
| 4,526,108 | 7/1985 | Spencer | 105/55 |
| 4,546,706 | 10/1985 | Jackson | 105/182.1 |
| 4,851,617 | 7/1989 | Schmitt | 191/49 |

FOREIGN PATENT DOCUMENTS

| | | | |
|---|---|---|---|
| 483881 | 10/1929 | Germany | 191/49 |
| 560772 | 6/1977 | U.S.S.R. | 191/49 |

Primary Examiner—Michael S. Huppert
Assistant Examiner—Scott L. Lowe
Attorney, Agent, or Firm—Schmeiser, Olsen & Watts

[57] ABSTRACT

The present invention is a third rail assembly that includes a beam made of synthetic material which will not crack upon exposure to the elements so that conductive material such as water, grease, or the like will not settle in the cracks. Also, the beam is lightweight for ease of installation and very strong so that the beam will not be destroyed when the third rail collector encounters an obstacle.

8 Claims, 2 Drawing Sheets

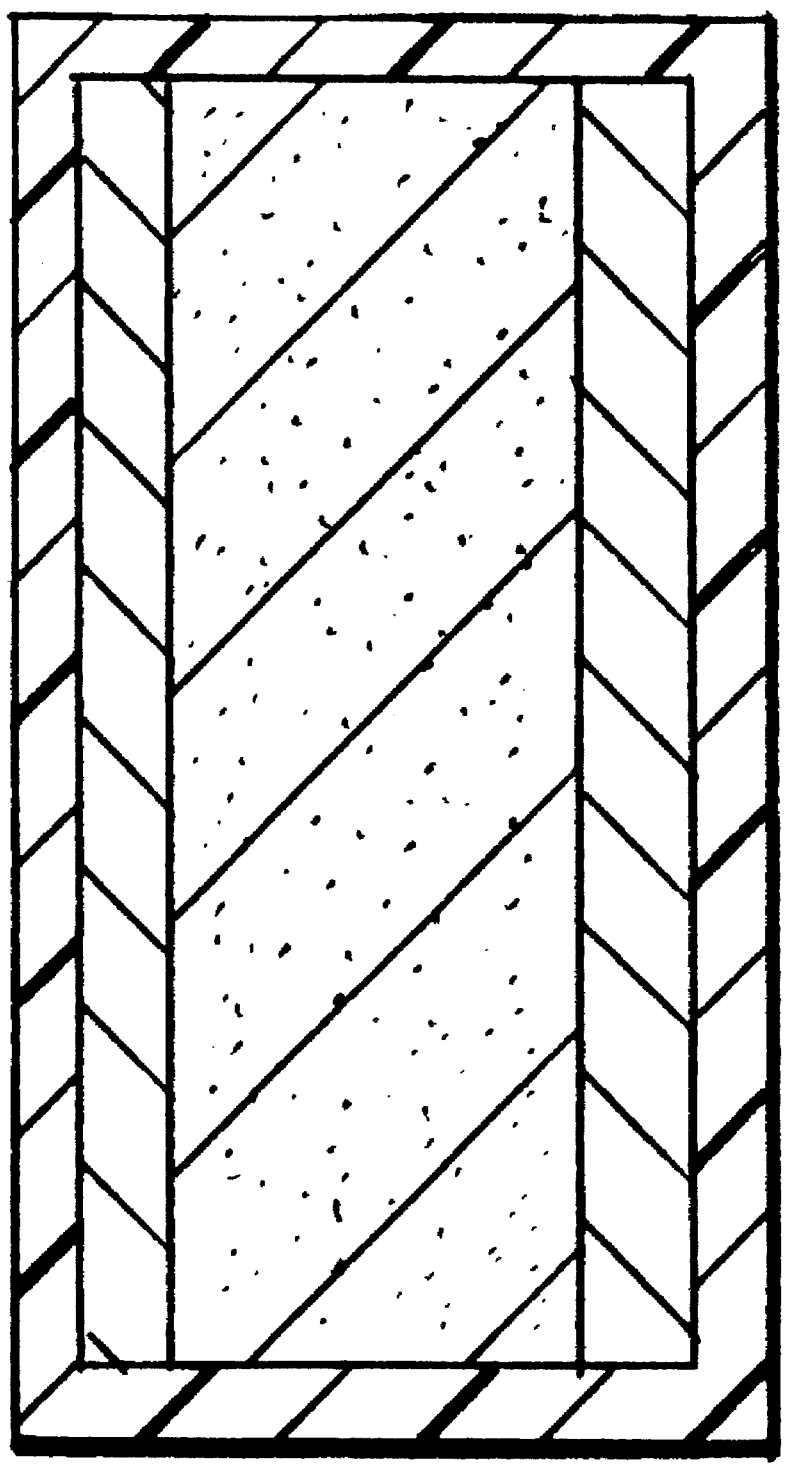
FIG_3

THIRD RAIL COLLECTION ASSEMBLY AND BEAM THEREFOR

FIELD OF THE INVENTION

The present invention relates generally to devices used in conjunction with railways and railed vehicles. In particular, the present invention is concerned with a third rail collection assembly and a method of making the same.

BACKGROUND OF THE INVENTION

The third rail collection assembly is mounted on a railed vehicle for use as an electric current collector for running engagement with a third rail or electrical distribution rail. The third rail collection assembly includes a collection shoe or boot which is resiliently or retractably mounted to a support. The support includes a beam which acts as an insulator to prevent passive electrical contact between the third rail and the body of the railed vehicle. The passive electrical contact results in undesirable grounding between the third rail and the railed vehicle.

Heretofore, beams for use on the third rail assembly have traditionally been made of wood and more particularly oak. Oak has been used in the past for the beam because it is extremely strong and very rigid. Wooden beams, however, have many drawbacks for preventing electrical contact. One difficulty with the wooden beam is that as it is exposed to the elements and weathers, cracks are formed in the beam. Water, grease and other materials settle in the cracks and increase the conductivity of the beam thus promoting electrical arcing between the third rail and the railed vehicle. When the water in the cracks turns to ice it expands and increases the crack formation, thus increasing the surface area over which water or other conductive materials may be present in the beam.

Another difficulty occurs when the third rail collector shoe encounters an obstacle such as a rock, ice, or the like. When this occurs, the third rail collector shoe breaks off so that the railed vehicle will not be damaged. However, in addition to the third rail collector shoe breaking, the wooden beam arc shield tends to break or crack and thus needs to be replaced along with the collector shoe. Assembly and replacement of the wooden beam is difficult because the wooden beams are very heavy to lift resulting in excessive back strain or the need for heavy equipment.

U.S. Pat. Nos. 1,308,543 and 1,766,639 to Howe; and 4,546,706 to Jackson et al. disclose third rail assemblies having wooden beams. The wooden beams are mounted between the third rail collector assemblies and the body of the railed vehicle to prevent passive electrical contact.

Other patents which disclose further features and embodiments of various third rail collectors for use with railed vehicles include: U.S. Pat. Nos. 3,509,292 to Dehn; 3,089,005 to Dean et al.; 3,733,446 to Colovas et al.; 3,804,996 to Monteith; 4,526,108 to Spencer et al.; and 4,851,617 to Schmitt et al.

The above related art summaries are merely representative of portions of the inventions disclosed in each reference. In no instance should these summaries substitute for a thorough reading of each individual reference.

SUMMARY OF THE INVENTION

The present invention overcomes the difficulties of the aforementioned beams of the prior art by providing all the advantages yet having none of the disadvantages. The present invention is a beam and a third rail assembly that will not crack upon exposure to the elements so that conductive material such as water, grease, or the like will not settle in the cracks. Also, the beam is lightweight for ease of installation and very strong so that the beam will not be destroyed when the third rail collector encounters an obstacle.

BRIEF DESCRIPTION OF THE DRAWINGS

FIG. 3 is a cutaway view of the beam of the present invention.

DETAILED DESCRIPTION OF THE PREFERRED EMBODIMENTS

Figure 1:
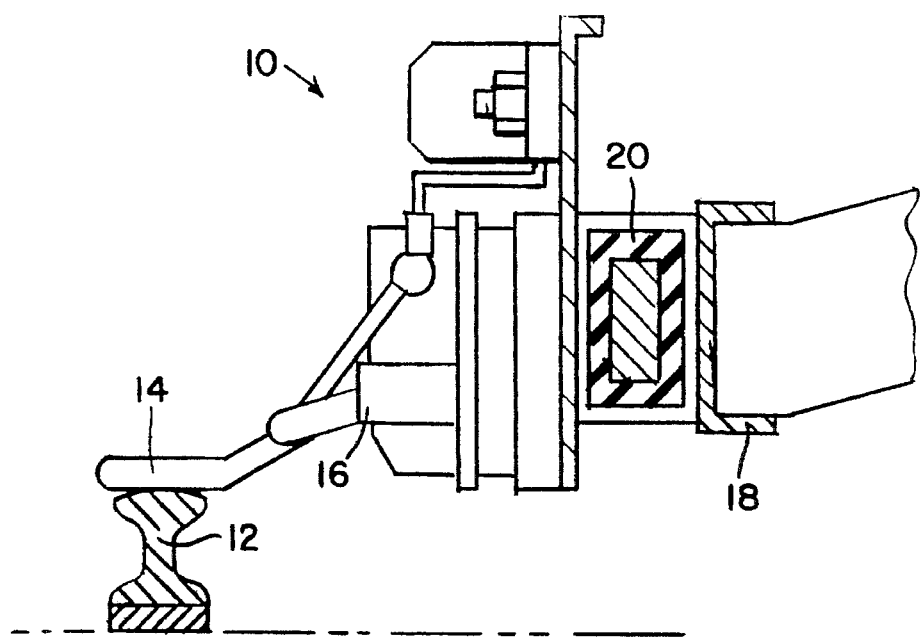
FIG. 1 is a cutaway side view of the third rail assembly of the present invention.

FIG. 1 discloses the third rail collector assembly 10 of the present invention in running engagement with a third rail 12. The collector assembly 10 includes a collector shoe 14 and third rail collection gear 16. The third rail collection gear 16 is electrically insulated from the railed vehicle by an insulator beam 20.

Referring to FIGS. 3, the third rail beam 20 is depicted. The beam 20 includes slabs 32, 34 of relatively rigid material such as wood. In a preferred embodiment, a foam core 36, such as polyurethane or polystyrene is cut for placement between plywood slabs 32, 34. Optionally, a solid wood core may be used, or foam may be injected directly between the slabs. The foam core 36 reduces the overall weight of the beam 20 thus reducing the possibility of back injury to the persons installing the beam as well as reducing cost. After the foam core 36 is placed between the slabs 32, 34, the assembly is drilled or punched to provide holes therein for placement of bolts or studs 22, 24, 26, 28. The bolts or studs 22, 24, 26, 28 hold the foam core 36 during the molding process. During molding, a thermoplastic material such as polyurethane, UHMW, nylon, or other dielectric material is used for the exterior covering 30. In a preferred embodiment, the foam core is formed of polystyrene, preferably in the form of STYROFOAM, a light, resilient, polystyrene plastic, and the exterior is formed using polyurethane.

Figure 2:
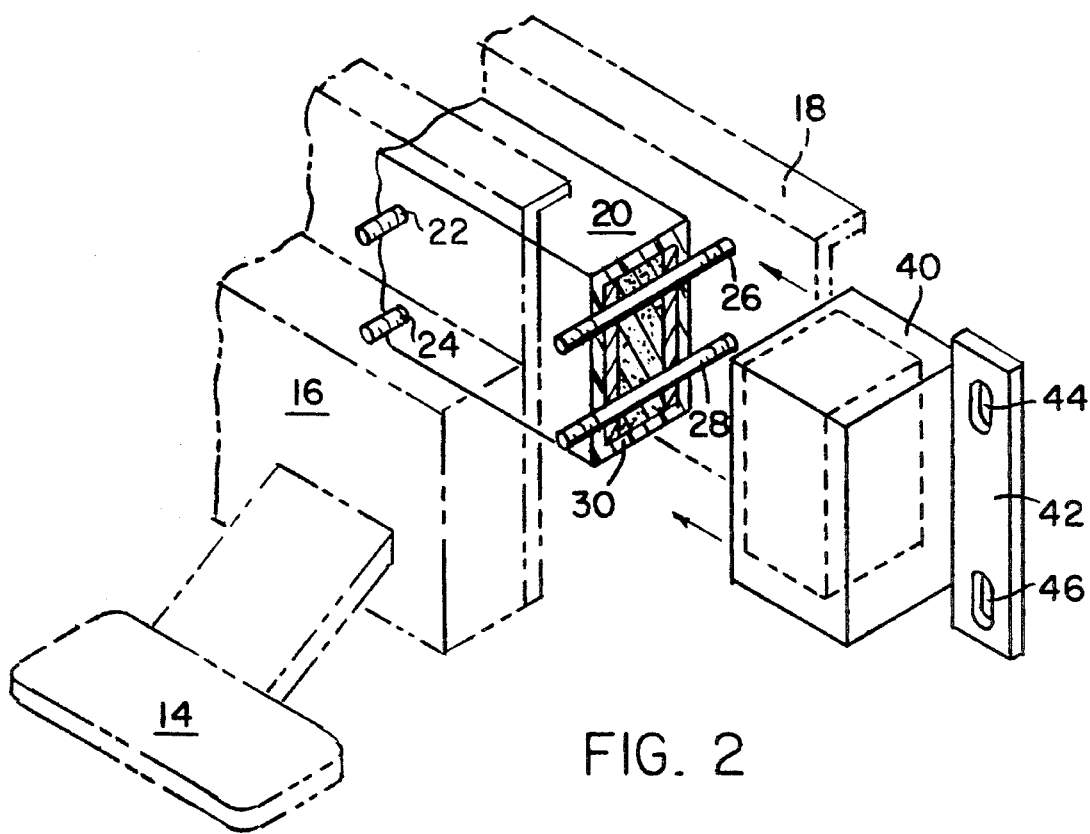
FIG. 2 is a perspective view of the third rail assembly of the present invention.

As shown in FIG. 2, the beam 20 is attached to an open channel member 18 and the third rail collection gear 16 by bolts or studs 22, 24, 26, 28. Holders 40 are inserted over the end of the beams 20. The holders 40 include a flange 42 having slotted holes 44, 46 therein. The slotted holes 44, 46 allow for vertical adjustment of the beam 20. During maintenance of the railed vehicle, the wheels must be ground or turned to compensate for uneven wear. After the wheels are ground or turned, the height of the shoe 14 with respect to the third rail 12 is adjusted. Slotted holes 44, 46 are used to compensate for the variation in height.

The embodiments disclosed herein have been discussed for the purpose of familiarizing the reader with the novel aspects of the invention. Although preferred embodiments of the invention have been shown, many changes, modifications and substitutions may be made by one having ordinary skill in the art without necessarily departing from the spirit and scope of the invention as described in the following claims.

I claim:

1. Apparatus comprising:

an elongate insulator beam attached to a railed vehicle between a third rail collector assembly and said railed vehicle, said beam having an interior made of a first material construction and a dielectric exterior made of a second material construction.

2. The apparatus of claim 1, wherein the first material construction is of a resilient, polystyrene plastic.

3. The apparatus of claim 1, wherein the second material construction is polyurethane.

4. The apparatus of claim 1 further comprising:

a holder connected to said beam.

5. The apparatus of claim 4 wherein the holder includes slotted holes, whereby the beam may be adjusted with respect to a third rail.

6. A method of making a third rial assembly comprising:

molding a beam from a dielectric material, attaching a third rail collection gear to said beam; and inserting said beam into a holder.

7. The method of making a third rail collection assembly of claim 6, wherein the molding step further comprises:

providing a core made of a first material construction and molding an exterior with a second material construction.

8. The method of making a third rail collection assembly of claim 6, after the inserting step:

adjusting the holder with respect to a third rail.

* * * * *